May 21, 1929.  R. A. GRAY  1,713,899
TIRE INFLATER
Filed Oct. 7, 1926
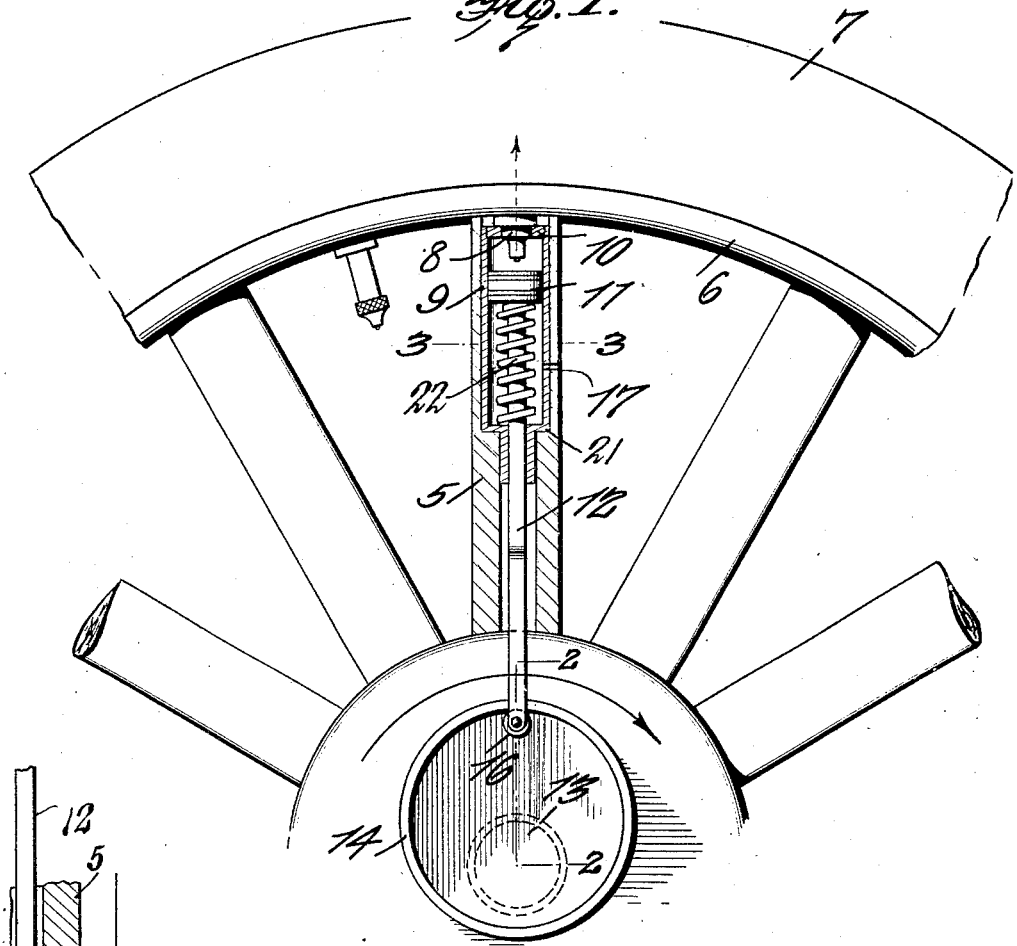
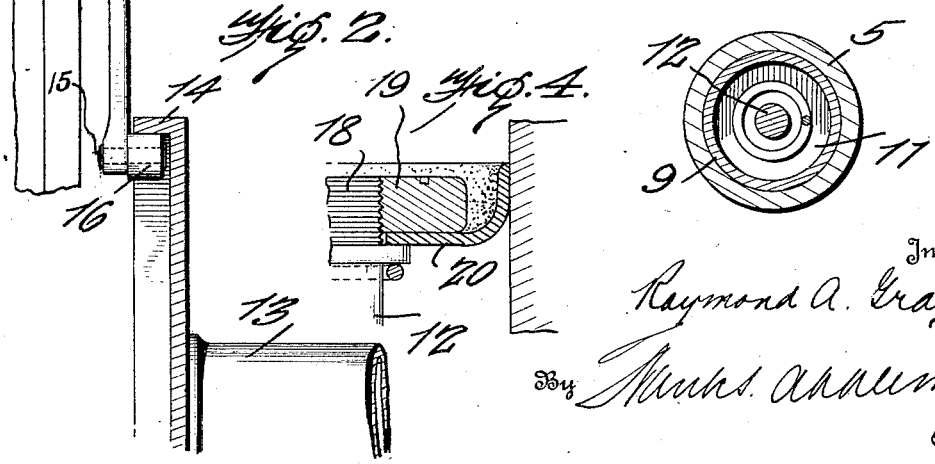
Inventor
Raymond A. Gray.
By
Attorney Patented May 21, 1929.

1,713,899

UNITED STATES PATENT OFFICE.

RAYMOND A. GRAY, OF ROCK, KANSAS.

TIRE INFLATER.

Application filed October 7, 1926. Serial No. 140,074.

This invention relates to tire inflating attachments for wheels of automobiles and it has for its object the provision of novel means whereby pressure in a tire may be automatically maintained uniform, and it is further an object of the invention to provide a compressor for each wheel on which a tire to be inflated is installed, the said compressor having spring means for actuating the compressing element in a direction to force air into the tire, the power of the said actuating means being equal to the maximum pressure to be maintained in the said tire, the said device having mechanism for positively retracting the compressing element after motion has been imparted to it by its aforesaid actuating means.

It is a further object of this invention in its more specific embodiment to provide a compressor element moved by a spring of such strength as to actuate the said compressor element to force air into the tire.

A further object of this invention is to provide a wheel having thereon an inflatable tire with a spoke which has therein elements of an air compressing pump and an elongated opening on its inner side for the passage of a piston rod, the end thereof engaging with a stationary eccentric flange which is located beyond the hub of the wheel so that none of the parts will be exposed to the view of casual observers and in which the appearance of the wheel will not differ from those of ordinary construction.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a wheel showing a device embodying the invention applied thereto, the same being partly in section;

Figure 2 illustrates an enlarged detail view on the line 2—2 of Figure 1;

Figure 3 illustrates a sectional view of the device on the line 3—3 of Figure 1; and Figure 4 illustrates a sectional view on the line of the arrow in Figure 1.

In these drawings 5 denotes a hollow spoke forming one element of a wheel having a rim 6 and a tire 7, the latter of which has a conventional type of valve stem 8 leading through the rim and projecting into the hollow spoke. A cylinder or barrel 9 may be located in the spoke and it preferably has a packing element 10 in its outer end which coacts with the valve stem 8 to produce an air tight joint where the valve stem enters the cylinder.

A compression element or piston 11 operates in the cylinder and a piston rod 12 is connected to the piston and it extends inwardly through the spoke and terminates at the side of the hub of the wheel.

The cylinder has a shoulder 21 which forms an abutment for one end of a spring 22 that surrounds the piston rod; the other end of said spring engages the underside of the piston 11 and urges said piston on its compression stroke with sufficient force to compress the air in the compression space of the cylinder to the desired pressure.

An axle 13 or some stationary part of the structure with relation to which the wheel rotates is provided with a ring 14 which is attached to the stationary structure eccentrically with relation to the axle, and the inner end of the piston rod 12 has an angularly disposed end which has mounted thereon a roller 16 which bears against the internal surface of the rim of the eccentric as the wheel rotates.

Specifically, in the present embodiment of the invention, the angularly disposed element which engages the flange of the stationary eccentric 14 comprises a pin 15 projecting at right angles to the longitudinal axis of the piston and an anti-friction roller 16 is mounted on the pin in position to engage the internal surface of the flange of the eccentric, so that as the wheel rotates and carries the piston rod around and the spring forces the piston rod outwardly, the anti-friction roller will be in engagement with the eccentric, the said piston rod will be drawn inwardly against the action of the spring and thereafter the spring will exert force to move the piston outwardly for compressing air.

If at the completion of the compression stroke, the air pressure in the tire is less than that in the compression space, some air will enter the tire, and when the eccentric then retracts the piston, more air will enter the cylinder at atmospheric pressure.

If, however, the air pressure in the tire is equal to that in the compression space at the completion of the pressure stroke, no air will enter the tire, and upon retraction of the piston, the compressed air in the compression space will expand to its original volume and no more air will enter the cylinder from the atmosphere and pumping action will cease.

Of course, the valve stem 8 is supposed to be supplied with the ordinary check valve so common in inflatable tires so that a detailed illustration of this feature is believed unnecessary, as a valved piston head and valve beyond the same may be of ordinary construction, for instance, as shown in U. S. patent to Paul Kuehn, No. 1,283,416, and when a leather washer valve is used, it will function the same as a valved piston head.

The piston rod is provided with a threaded end 18 which is engaged by a nut 19 for holding the piston packing 20 on the piston rod, as shown in Figure 4.

I claim—

1. In an inflater for pneumatic tires, a valved way which communicates with the interior of the tire, a spoke and cylinder which communicates with the way, an abutment at the opposite end of the cylinder from the way, a piston rod having an offset portion which extends through and beyond the spoke, a piston head for the cylinder, a spring within the cylinder, the ends thereof engaging the abutment and the piston head, a roller attached to the end of the piston rod furthest from its head, a flanged disk fixedly attached to a non-movable portion of an axle and maintained in position to be engaged by the roller on the piston rod to effect reciprocation of the piston rod when held against the same by expansion of the spring.

2. In an inflater for wheels having pneumatic tires, a tubular spoke for the wheel which is connected at its outer end with a valved way that communicates with the interior of the tire, an abutment within the spoke, an opening through the spoke, a piston rod having an offset end which extends through the opening and beyond the inner side of the spoke, a piston head attached to the piston rod, a roller on the inward extending end of the piston rod, a spring which encircles the piston rod and engages the abutment and the piston head, a disk having an outward extending eccentric flange, said disk being fixedly attached to a non-rotative portion of a wheel support, the spring having an effective expansion force which will force air into the tire at a predetermined pressure which when attained will automatically cause cessation of injection of air into the tire.

3. Means for automatically inflating a tire carried by a wheel through a valved opening comprising a spoke constructed to provide therein a cylinder, a piston movable within the cylinder, a piston rod, a spring which encircles a portion of the piston rod and exerts pressure against the piston, a longitudinal opening through the spoke for the passage of a portion of the piston rod, a stationary eccentric having a marginal flange with which the piston rod engages, the parts being organized so that in operation pumping action takes place only upon reduction of pressure in the tire.

4. In a tire inflater, a wheel having radially disposed spokes, one of the spokes being constructed to provide therein a cylinder, a tire having a valve, means for maintaining an air tight connection between the valve and the interior of the cylinder, a piston head in the cylinder, a piston rod connected to the piston head and extending inwardly through an elongated opening formed through the spoke, a spring operating to move outwardly, and non-rotative means for moving the piston against the action of the spring as the wheel rotates.

5. In an automatic tire inflater, a wheel having spokes of similar appearance, one of the spokes being constructed to provide therein a cylinder and beyond the cylinder an opening for the passage of a piston rod, a piston rod, a piston head attached to one end of the piston rod, a spring operative to urge the piston head outwardly and having force proportional to a predetermined maximum pressure to be stored in the tire, and a fixedly maintained flanged eccentric for pulling the piston rod against the action of the spring whereby pumping action only takes place upon reduction of air pressure in the tire.

RAYMOND A. GRAY.